(12) United States Patent
Chen

(10) Patent No.: US 10,163,002 B2
(45) Date of Patent: Dec. 25, 2018

(54) PEDESTRIAN DETECTION SYSTEM AND METHOD

(71) Applicant: CLOUD NETWORK TECHNOLOGY SINGAPORE PTE. LTD., Singapore (SG)

(72) Inventor: Po-Cheng Chen, New Taipei (TW)

(73) Assignee: Cloud Network Technology Singapore Pte. Ltd., Singapore (SG)

( * ) Notice: Subject to any disclaimer, the term of this patent is extended or adjusted under 35 U.S.C. 154(b) by 440 days.

(21) Appl. No.: 14/879,945

(22) Filed: Oct. 9, 2015

(65) Prior Publication Data
US 2017/0091541 A1    Mar. 30, 2017

(30) Foreign Application Priority Data

Sep. 29, 2015   (TW) .............................. 104131969 A

(51) Int. Cl.
*H04N 7/18* (2006.01)
*G06K 9/00* (2006.01)
*G06K 9/46* (2006.01)

(52) U.S. Cl.
CPC ..... *G06K 9/00369* (2013.01); *G06K 9/00664* (2013.01); *G06K 9/00979* (2013.01); *G06K 9/00993* (2013.01); *G06K 9/4642* (2013.01)

(58) Field of Classification Search
CPC combination set(s) only.
See application file for complete search history.

(56) References Cited

U.S. PATENT DOCUMENTS

| | | | |
|---|---|---|---|
| 8,930,416 B2* | 1/2015 | Coudurier | G06F 17/30194 707/808 |
| 8,965,104 B1* | 2/2015 | Hickman | G06T 7/00 382/153 |
| 2015/0172633 A1* | 6/2015 | Nobori | H04N 5/23238 348/36 |
| 2015/0254873 A1* | 9/2015 | Cox | G06T 9/20 382/242 |

FOREIGN PATENT DOCUMENTS

| | | |
|---|---|---|
| CN | 102238370 A | 11/2011 |
| TW | 201303753 A | 1/2013 |
| TW | 201508651 A | 3/2015 |

* cited by examiner

*Primary Examiner* — Janese Duley
(74) *Attorney, Agent, or Firm* — ScienBiziP, P.C.

(57) ABSTRACT

A pedestrian detection system including a camera device and a cloud server. The cloud server includes an entrance node and a compute node unit including a plurality of compute nodes. The entrance node is configured to receive image data from the camera device, to divide the image data into a plurality of subordinate task areas, and to extract a percent of the subordinate task areas. The compute node unit is configured to receive the percent of the subordinate task areas from the entrance node, and processes simultaneously the percent of the subordinate task areas. Therefore, an efficiency of processing image of pedestrian can be improved.

10 Claims, 8 Drawing Sheets

PEDESTRIAN DETECTION SYSTEM AND METHOD

FIELD

The subject matter herein generally relates to a pedestrian detection system and method.

BACKGROUND

Pedestrian traffic through busy intersections can cause gridlock, accidents, and/or injury. Typically, a city will employ a police officer to control traffic. Additionally, cameras can be installed.

BRIEF DESCRIPTION OF THE DRAWINGS

Implementations of the present technology will now be described, by way of example only, with reference to the attached figures.

DETAILED DESCRIPTION

Figure 1:
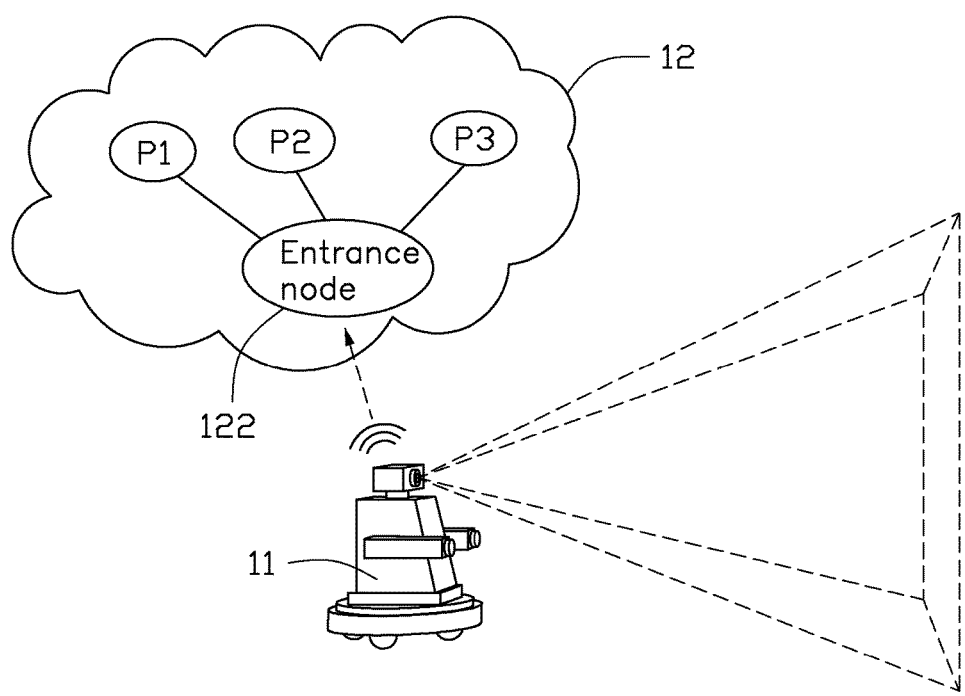
FIG. 1 is a diagrammatic view of one embodiment of a pedestrian detection system with a camera device and a cloud server.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The disclosure will now be described in relation to a pedestrian detection system and method.

Figure 2:
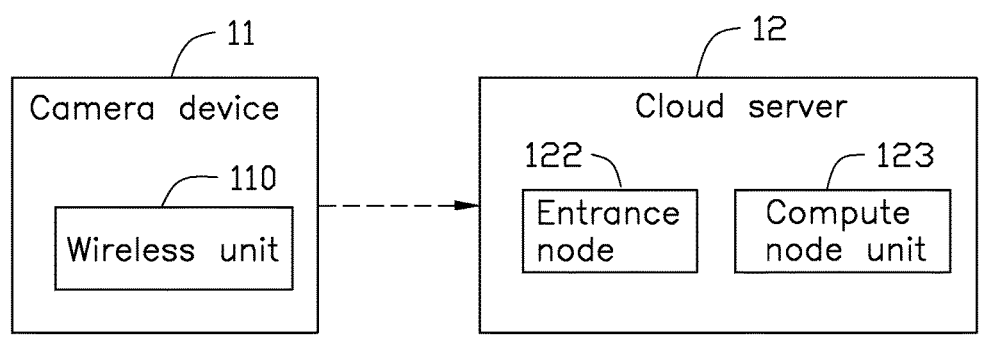
FIG. 2 is a block diagram of one embodiment of a pedestrian detection system.

FIG. 1 illustrates one embodiment of a pedestrian detection system 10. The pedestrian detection system 10 can include, but not limited to, a camera device 11 and a cloud server 12. In at least one embodiment, the cloud server 12 can be a cloud server farm. FIG. 2 illustrates a block diagram of one embodiment of the pedestrian detection system 10. In the illustrated embodiment, the camera device 11 is a monocular vision robot which can simulate monocular visual performance of human. The cloud server 12 includes an entrance node 122 and a compute node unit 123. The entrance node 122 includes a plurality of subordinate nodes, such as P1, P2, and P3. The pedestrian detection system 10 includes a wireless unit 110, and transmits data with the cloud server 12 with the wireless unit 110.

Figure 3:
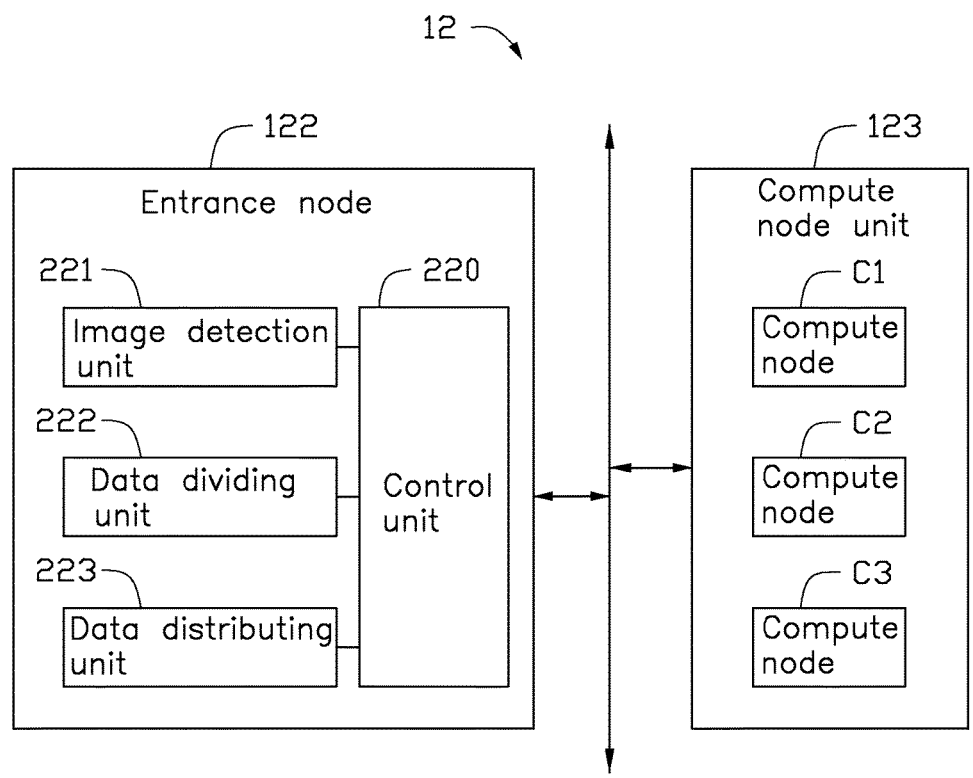
FIG. 3 is a block diagram of one embodiment of the cloud server of the pedestrian detection system of FIG. 2, wherein the cloud server includes an entrance node and a compute mode with a plurality of compute nodes.
Figure 4:
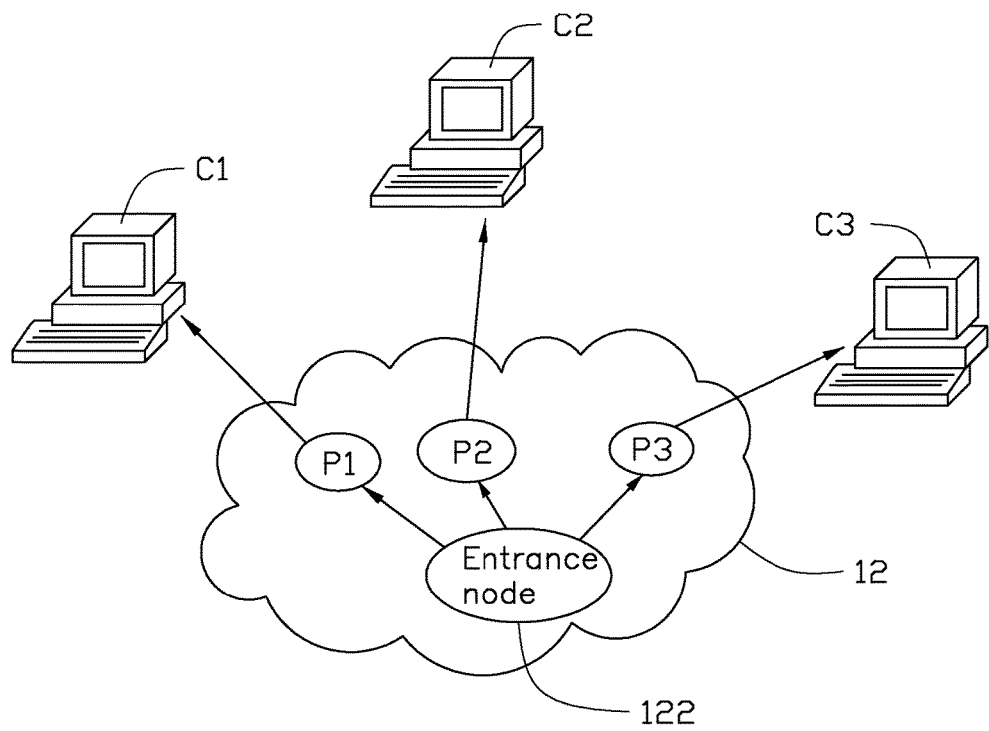
FIG. 4 is a diagrammatic view illustrating a compute mode of the cloud server extracts a percent sub-task and distributes the percent sub-task to each of the compute nodes.

FIG. 3 illustrates a block diagram of the cloud server 12. The entrance node 122 includes a control unit 220, an image detection unit 221, a data dividing unit 222, and a data distributing unit 223. The image detection unit 221, the data dividing unit 222, and the data distributing unit 223 are coupled to the control unit 220. The control unit 220 is configured to control the image detection unit 221 to receive image data from the camera device 11, and to control the data dividing unit 222 to divide the image data from the image detection unit 221 into a plurality of subordinate task areas. Each of subordinate nodes is corresponding to each of the subordinate task areas. The control unit 220 is also configured to control the data distributing unit 223 to extract a percent (such as 1%) of the subordinate task areas, to distribute the 1% of the subordinate task areas to the compute node unit 123. Referring to FIG. 4, the compute node unit 123 includes a plurality of compute nodes, such as C1, C2, and C3, which can receive the 1% of the subordinate task areas in average. Each of the compute nodes is a computer or a virtual machine with great ability of computing.

Figure 5:
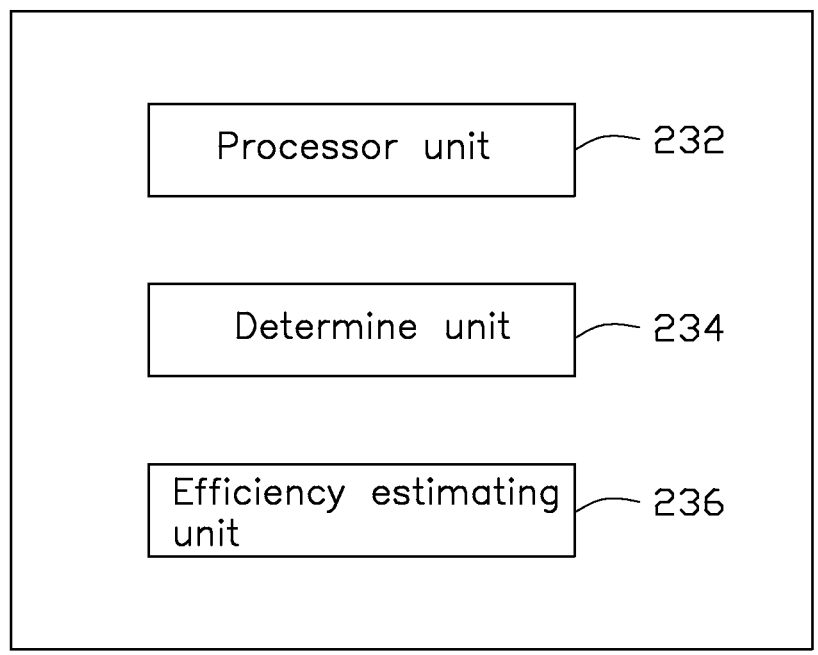
FIG. 5 is a block diagram of one embodiment of each of the compute nodes of the compute mode of FIG. 3.

FIG. 5 illustrates block diagram of each of the compute node of the pedestrian detection system 10. Each compute node includes a processor unit 232, a determine unit 234, and an efficiency estimating unit 236. The processor unit 232 includes a plurality of processor chips to compute data of each compute node. Each of the compute nodes can produce a number of worker threads, according to the number of the processor chips. Each of the worker threads is corresponding to one subordinate task area. The determine unit 234 is configured to determine whether each worker thread finishes the computing of the each subordinate test area, and feedback a determine result to the control unit 220 of the entrance node 122. The efficiency estimating unit 236 is configured to compute a computing efficiency of the corresponding compute node after the each worker thread finishes the computing of the corresponding subordinate test area, and to feedback the compute efficiency of each compute node to the determine unit 234. The determine unit 234 is configured to transmit a determine result of the computer efficiency to the control unit 220 of the entrance node 122. The control unit 220 of the entrance node 122 is configured to control a percent of subordinate task area distributed to each compute node by the data distributing unit 223, according to the determine result of the computer efficiency of the each compute node.

In the illustrated embodiment, the efficiency estimating unit 236 can compute the computer efficiency of each compute node by a first formula and a second formula as follow:

$$CCi = \frac{\sum_{j=1}^{Mi} Tij}{Mi}, \text{ and } CPi = \frac{1}{CCi},$$

with an illustrate of that the cci is a compute cost of each compute node, the CPi is the compute efficiency of one compute node, and the $\Sigma_{j=1}^{Mi}$ Tij is a summation of computing time of all of the worker threads.

Figure 6:
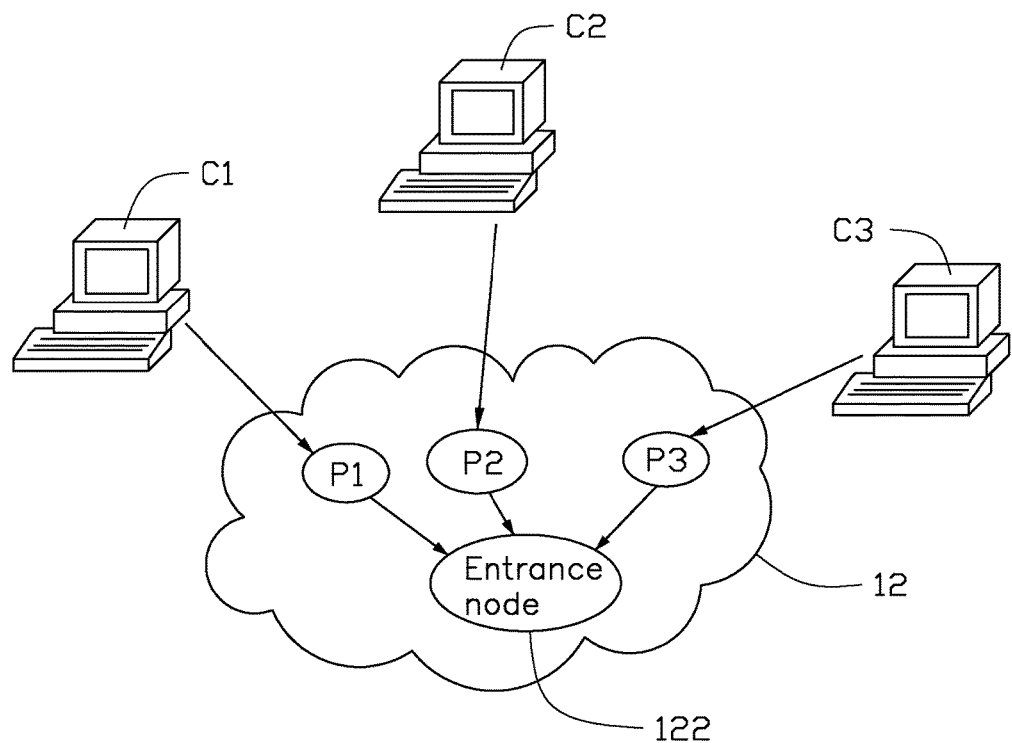
FIG. 6 is a diagrammatic view illustrating each of the compute nodes transmits a compute result to the entrance node of the cloud server.

For example, the compute node C1 can produce four worker threads, if operation times of the four worker threads are 6 ms, 12 ms, 14 ms, and 8 ms respectively, the compute cost CCi of the compute node C1 is 10 ms by computing as the first formula, and the compute efficiency of the compute node C1 is 1/10 by computing as the second formula. Referring to FIG. 6, the compute node C1 transmits the compute result of the corresponding subordinate task areas and the compute efficiency CPi to the control unit 220 of the entrance node 122.

The control unit 220 of the entrance node 122 can also compare states of all of the compute nodes, according to the compute efficiency CPi of each compute node, and to adjust a percent of subordinate task areas distributed to each compute node. In the embodiment, the percent of subordinate task areas distributed to each compute node can be expressed by Wi, and the computing formula as follow:

$$Wi = \frac{CPi}{\sum_{j=1}^{N} CPi} \times 100\%,$$

with an illustrate of that CPi is the compute efficiency of one compute node, and the is a summation of computing efficiency of all of the compute node.

For example, Wi1 is a percent of subordinate task areas distributed to compute node C1, if each compute efficiency of the compute nodes C2 and C3 are 1/20 and 1/5, the control unit 220 of the entrance node 122 can compute the Wi1 is 28.6% by computing through the formula, according to the each compute efficiency of the compute nodes C2 and C3. With the same principle, percent of the subordinate task areas distributed to compute nodes C1 and C2 can be computed by the control unit 220 of the entrance node 122. Therefore, the control unit 220 of the entrance node 122 can control the data distributing unit 223 to distribute the number of the subordinate task areas to each of the compute node, according to the percent of each compute node received.

If each worker thread has not finished the computing of the each subordinate test area, the control unit 220 controls the data distribute unit 223 to extract a percent (such as 10%) of the subordinate task areas, to distribute the 10% of the subordinate task areas to each of the compute nodes.

Figure 7:
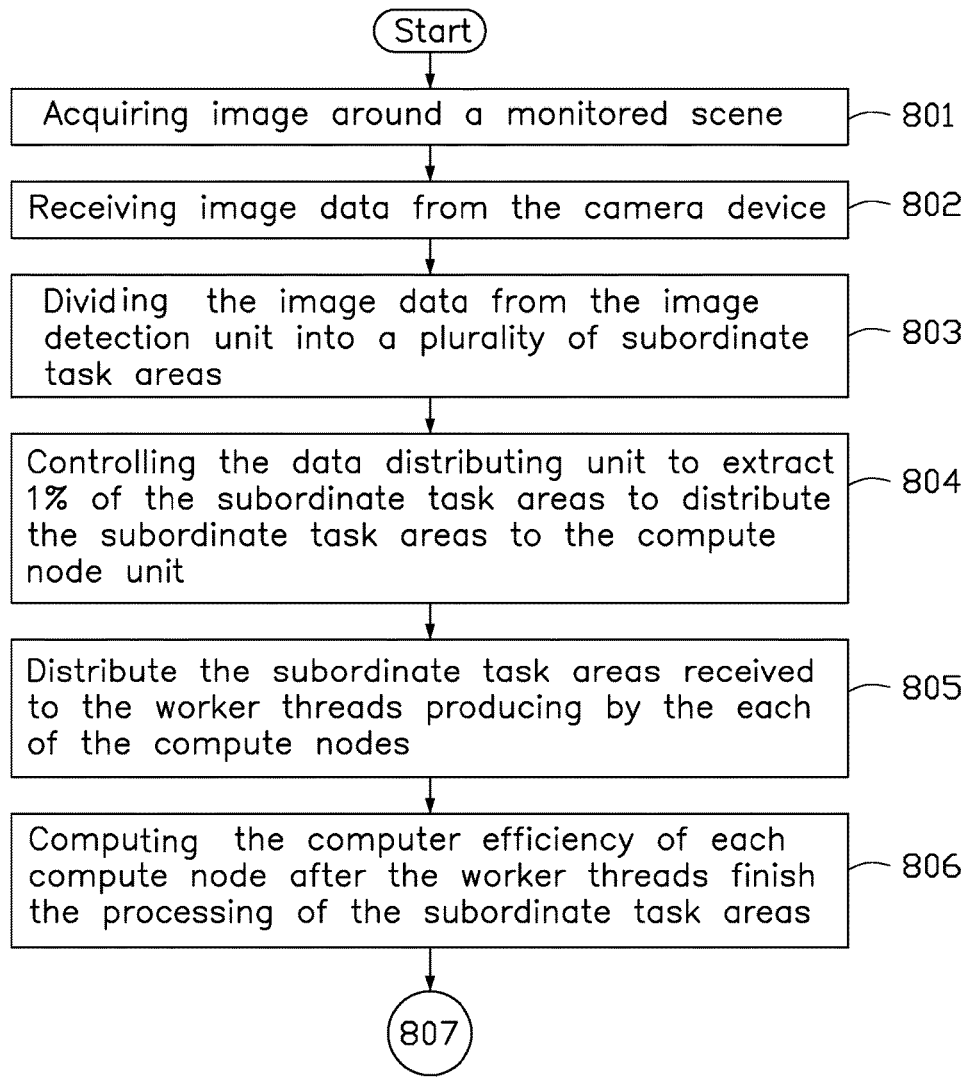
FIG. 7 is a first partial flowchart of one embodiment for detecting a pedestrian image by the pedestrian detection system of FIG. 1
Figure 8:
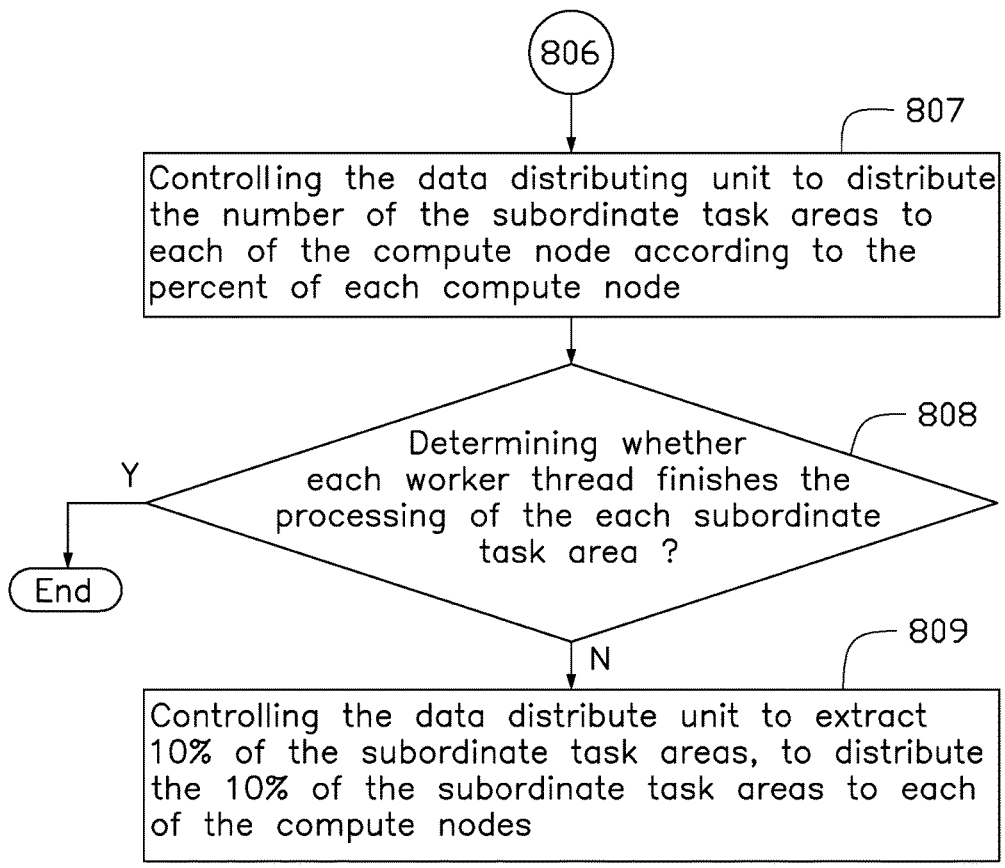
FIG. 8 is a second partial flowchart of one embodiment for detecting a pedestrian image by the pedestrian detection system of FIG. 1

Referring to FIGS. 7 and 8, flowcharts are presented in accordance with an example embodiment of an pedestrian detection system which are being thus illustrated. The example method is provided by way of example, as there are a variety of ways to carry out the method. The method described below can be carried out using the configurations illustrated in FIG. 1, for example, and various elements of the figure is referenced in explaining example method. Each block shown in FIGS. 7 and 8 represent one or more processes, methods or subroutines, carried out in the exemplary method. Furthermore, the illustrated order of blocks is by example only and the order or fewer blocks may be utilized, without departing from this disclosure. The exemplary method can be executed by pedestrian detection system 10, and can begin at block 801.

Regarding to FIG. 7, at block 801, the camera device 11 acquires image around a monitored scene. In the illustrated embodiment, the camera 11 is a monocular vision robot which can simulate monocular visual performance of human.

At block 802, the image detection unit 221 receives image data from the camera device 11.

At block 803, the data dividing unit 222 divides the image data from the image detection unit 221 into a plurality of subordinate task areas.

At block 804, the control unit 220 controls the data distributing unit 223 to extract a percent (such as 1%) of the subordinate task areas, to distribute the 1% of the subordinate task areas to the compute node unit 123.

At block 805, each of the compute nodes can produce a number of worker threads, according to the number of the processor chips, and distribute the subordinate task areas received to each worker thread averagely. In the illustrated embodiment, each of the worker threads is corresponding to one subordinate task area.

At block 806, the efficiency estimating unit 236 can compute the computer efficiency of each compute node, after the worker threads finish the processing of the subordinate task areas, and feedback a computer efficiency of each compute node to the determine unit 234.

Regarding to FIG. 8, at block 807, the control unit 220 of the entrance node 122 controls the data distributing unit 223 to distribute the number of the subordinate task areas to each of the compute node, according to the percent of each compute node received from the determine unit 234.

At block 808, the determine unit 234 determines whether each worker thread finishes the processing of the each subordinate task area, if each worker thread has not finished the computing of the each subordinate task area, the processor goes to block 809, otherwise, the process goes to end.

At block 809, the control unit 220 controls the data distribute unit 223 to extract a percent (for example 10%) of the subordinate task areas, to distribute the 10% of the subordinate task areas to each of the compute nodes.

Therefore, an efficiency of processing image of pedestrian can be improved. Accuracy of distinguish of the image can be also improved.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A pedestrian detection system comprising:
   a camera device; and
   a cloud server comprising:
      an entrance node configured to:
         receive image data from the camera device;
         divide the image data into a plurality of subordinate task areas; and
         extract a percent of the subordinate task areas;
      a compute node unit including a plurality of compute nodes, and configured to:
         receive the percent of the subordinate task areas from the entrance node; and processes simultaneously the percent of the subordinate task areas;

wherein the entrance node includes a controller and a data divider coupled to the controller, the controller is configured to control the data divider to divide the image data from the image detector into a plurality of subordinate task areas; each of the compute nodes can produce a number of worker threads and includes an efficiency estimating unit configured to compute the computer efficiency of each compute node after the worker threads finish the processing of the subordinate task areas, and feedback a computer efficiency of each compute node to the controller of the entrance node.

2. The pedestrian detection system according to claim 1, wherein the entrance node further includes an image detector and a data distributer; the image detector, the data divider, and the data distributer are coupled to the controller; the controller is configured to control the image detector to receive image data from the camera device, and to control the data divider to divide the image data from the image detector into a plurality of subordinate task areas; each of subordinate nodes is corresponding to each the subordinate task areas; the controller is also configured to control the data distributer to extract a 1% of the subordinate task areas, to distribute the 1% of the subordinate task areas to the compute node unit.

3. The pedestrian detection system according to claim 2, wherein each of the compute nodes includes a plurality of processor chips, and can produce a number of worker threads according to the number of the processor chips; each of the worker threads is corresponding to one subordinate task area.

4. The pedestrian detection system according to claim 3, wherein each of the compute nodes includes a determine unit configured to determine whether each worker thread finishes the computing of the each subordinate test area, and feedback a determine result to the controller of the entrance node.

5. The pedestrian detection system according to claim 4, wherein the controller of the entrance node can also adjust a percent of subordinate task areas distributed to each compute node next time, according to the computer efficiency of each compute node receives currently.

6. The pedestrian detection system according to claim 5, wherein if each worker thread has not finished the computing of the each subordinate test area, the controller controls the data distributing unit to extract a 10% of the subordinate task areas, to distribute the 10% of the subordinate task areas to each of the compute nodes.

7. A pedestrian detection method comprising:
acquiring image around a monitored scene;
receiving image data and dividing the image data into a plurality of subordinate task areas;
extracting a percent of the subordinate task areas, to distribute the percent of the subordinate task areas to a plurality of compute nodes; and
processes simultaneously the percent of the subordinate task areas;
wherein each of the compute nodes includes an efficiency estimating unit configured to compute a computer efficiency of each compute node after worker threads finish processing of subordinate task areas, and feedback the computer efficiency of each compute node to the controller of an entrance node through a determine result.

8. The method according to claim 7, further comprising a step of computing each subordinate test area by a corresponding worker thread producing by each compute node according to a number of processor chips.

9. The method according to claim 8, wherein the controller of the entrance node also adjusts a percent of subordinate task areas distributed to each compute node next time, according to the computer efficiency of each compute node receives currently.

10. The method according to claim 9, wherein if each worker thread has not finished the computing of the each subordinate test area, the controller controls a data distribute unit to extract a 10% of the subordinate task areas, to distribute the 10% of the subordinate task areas to each of the compute nodes.

* * * * *